United States Patent [19]

Hains

[11] 4,430,890
[45] Feb. 14, 1984

[54] TWO LAYER HYDRAULIC ANALOGY METHOD FOR TESTING SUPERSONIC GAS FLOWS WITH SHOCK WAVES

[75] Inventor: Franklin D. Hains, Falls Church, Va.

[73] Assignee: The United States of America as represented by the Secretary of the Navy, Washington, D.C.

[21] Appl. No.: 378,161

[22] Filed: May 14, 1982

[51] Int. Cl.³ ............................................. G01M 9/00
[52] U.S. Cl. ................................. 73/147; 73/432 SD
[58] Field of Search ............................ 73/147, 432 SD

[56] References Cited

PUBLICATIONS

Hoyt, Applied Mechanics Review, vol. 15, No. 6, pp. 419-423, Jun. 1962.
Shapiro, Physical Measurement in Gas Dynamics and Combustion, Princeton University Press, pp. 309-321, 1954.

*Primary Examiner*—Donald O. Woodiel
*Attorney, Agent, or Firm*—R. F. Beers; K. E. Walden; D. J. Breh

[57] ABSTRACT

A method of studying steady and unsteady supersonic gas flow using a two layer hydraulic analogy technique. The method simulates the specific heat ratio of the gas. Two layers of immiscible liquids having different densities and thicknesses are held in a shallow container. The densities are chosen and the layer thicknesses are adjusted to simulate the specific heat ratio of the gas. A model of a device to be studied is submerged in the liquid. Relative flow is caused to occur between the model and liquid simulating steady flow. The depth of the lower layer during the period of relative flow is measured and is analogous to steady state gas flow characteristics. For studying unsteady flow two bodies of liquids each having two layers of liquids of densities chosen, and lower layer thicknesses adjusted to simulate the specific heat ratio of the gas and to simulate a high and low pressure across a gas system, are held in a container separated by a removable gate. Flow is caused to occur from the high to low pressure liquid body simulating unsteady flow. The depth of the lower layers during the period of flow is analogous to unsteady gas flow characteristics.

14 Claims, 5 Drawing Figures

TWO LAYER HYDRAULIC ANALOGY METHOD FOR TESTING SUPERSONIC GAS FLOWS WITH SHOCK WAVES

BACKGROUND OF THE INVENTION

This invention relates to the field of test instrumentation and more particularly to an instrument and method for studying supersonic compressible gas flow by the hydraulic analogy technique. In still greater particularity the invention relates to an instrument for simulating the thermodynamic property specific heat ratio of a gas for the proper application of the hydraulic analogy technique.

It is well known by those skilled in compressible and hydraulic flow analysis that an analogy exists between gas and hydraulic flow systems. This analogy exists due to the similarity in the equations that describe the two dimensional flow characteristics of the two systems, i.e., continuity, momentum and pressure equations, when the Mach number of the compressible flow is equal to the Floude number of the hydraulic flow. It has been desirable to take advantage of this similarity to study compressible flow by using an hydraulic system to study hydraulic flow on a model and analogize the hydraulic results to the compressible system.

The analogy allows the study of compressible flow systems such as airfoil or turbine blade characteristics without the need to construct and operate large scale wind tunnels. Small scale model tests can be performed, drastically reducing test system complexity and cost. The hydraulic analogy tests are presently carried out using a shallow, single layer of a liquid medium, normally water. The liquid is caused to flow past a stationary model of the device under study, or the model is moved through the stationary liquid. Measurements of the depth of the liquid are taken at points near the model where data is desired. The measured depths are analogous to the temperature, density and pressure that would exist in the compressible medium at these same locations. It is known that the hydraulic analogy assumes that the thermodynamic property known as specific heat ratio of the gas in the system under study is 2. The specific heat ratio of most gases however is in the range 1.2 to 1.5. At room temperature, the specific heat ratio of the most common gas, air, is 1.4. When studying a gas system having a specific heat ratio other than 2, considerable error is introduced into the hydraulic analogue because the single layer water systems can not simulate specific heat ratios other than 2 with any degree of accuracy. Heretofore, attempts to simulate specific heat ratios other than 2 have centered on using flow channels whose cross-sections are other than rectangular. For example, V-shape channels have been found to give the analogue a specific heat ratio of 1.5, but they are difficult in which to physically perform experimented work.

It can be appreciated that to protect the validity of the hydraulic analogue it is desirable to be able to simulate the property specific heat ratio of the gas in the system under study.

SUMMARY OF THE INVENTION

It is an object of the invention to provide for a method of increasing the accuracy of the hydraulic analogy test technique for testing supersonic gas flow systems.

It is another object of the invention to provide for an hydraulic analogy test instrument that can extend the hydraulic analogy test technique to gases having specific heat ratios other than 2.

It is another object of the invention to provide for an hydraulic analogy test instrument that can simulate the thermodynamic property specific heat ratio.

Other objects and many attendant advantages will be readily appreciated as the subject invention becomes better understood by reference to the detailed description when considered in conjunction with the accompanying drawings.

Accordingly, the objects are achieved and the shortcomings of the prior art are overcome by providing an hydraulic test instrument that includes a container holding a shallow body of liquid medium. The body of liquid medium is made up of two layers of immiscible liquids having different densities. The thickness of the lower layer is thin as compared to the upper layer. The ratio of the upper layer thickness to the lower layer thickness is set according to the desired Mach number and specific heat ratio to be simulated. A cross-sectional model of the device to be tested is submerged in the two layer liquid medium and extends from the container bottom, through the lower liquid layer, through the upper and lower layer interface, and terminates in the upper layer. Relative flow between the model and the liquid body is caused to occur by either moving the model through the liquid body, or alternatively the liquid body is caused to flow past the model, at a predetermined speed which simulates the desired Mach number. The depth of the lower thin layer as measured from the container bottom to the two layer interface, at points of interest along the model, is measured and converted to analogous gas dynamic properties according to classical gas dynamic equations. The ratio of the densities of the upper and lower liquid layers and the ratio of the thickness of the two layers simulate the thermodynamic property specific heat ratio when adjusted as hereinafter set out.

DETAILED DESCRIPTION OF THE PREFERRED EMBODIMENT

Figure 1:
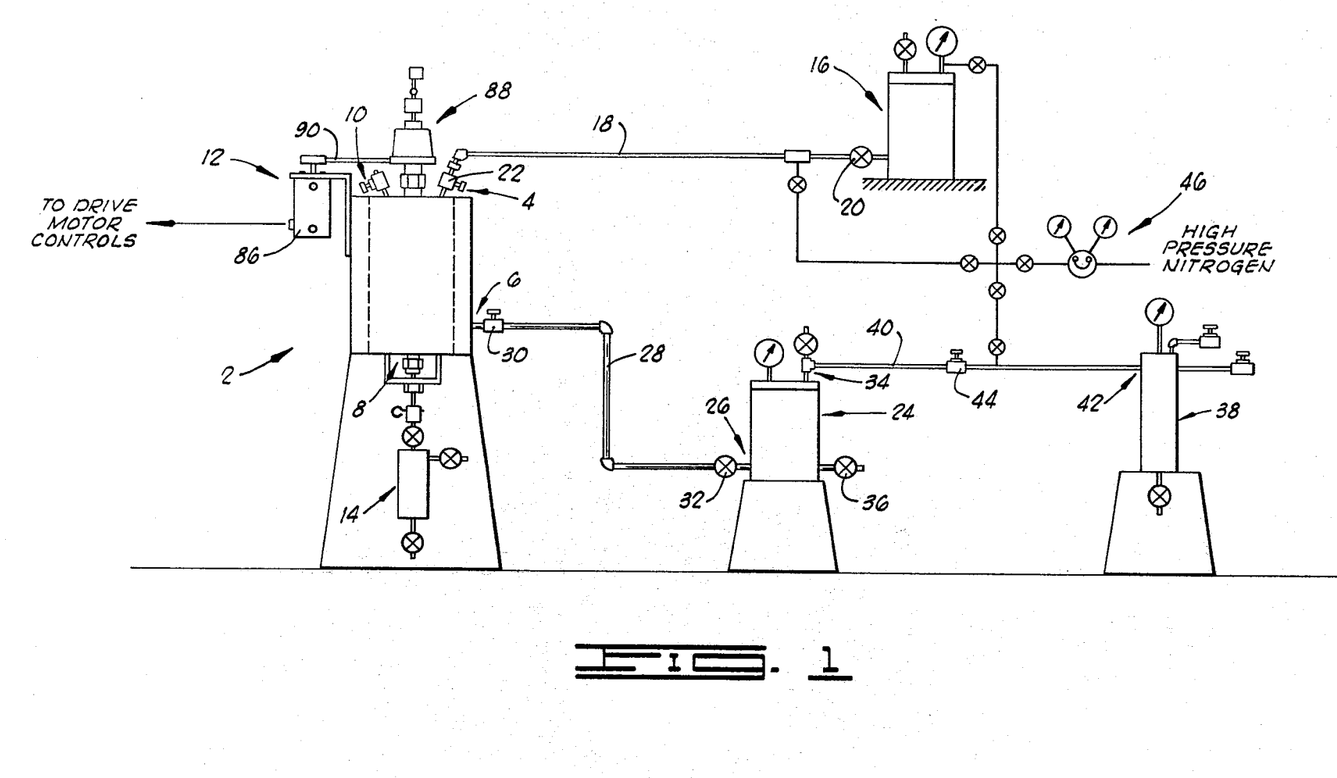
FIG. 1 is a plan view of the invention in use for studying steady state flow showing a model of an airfoil being pulled through the liquid medium and a resulting bow wave.
Figures 2, 3:
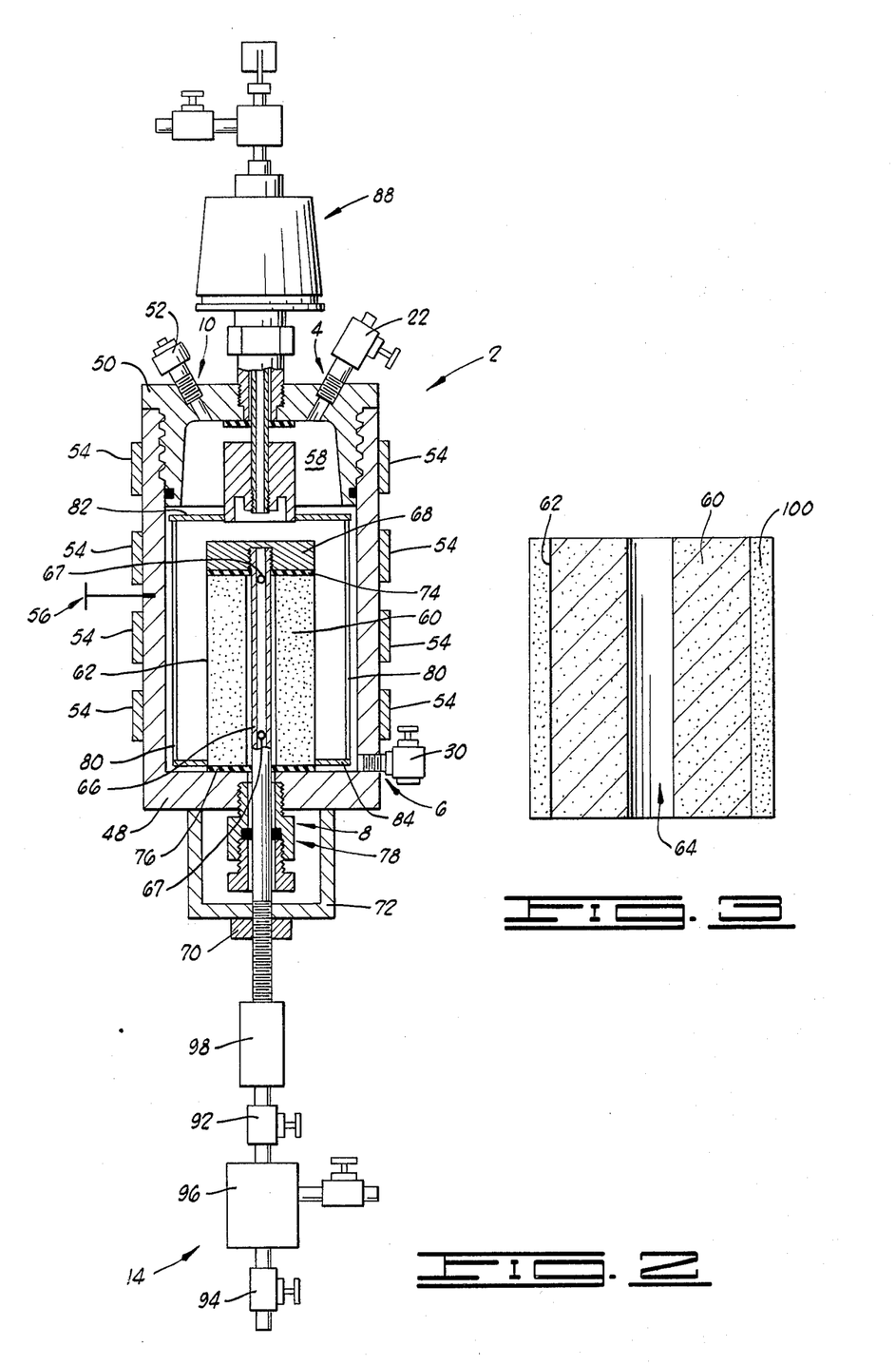
FIG. 2 is a vertical cross-sectional view through 2—2 of FIG. 1 showing details of the invention in use.
FIG. 3 is a plan view of an alternate embodiment of the invention for studying unsteady flow.
Figure 2:
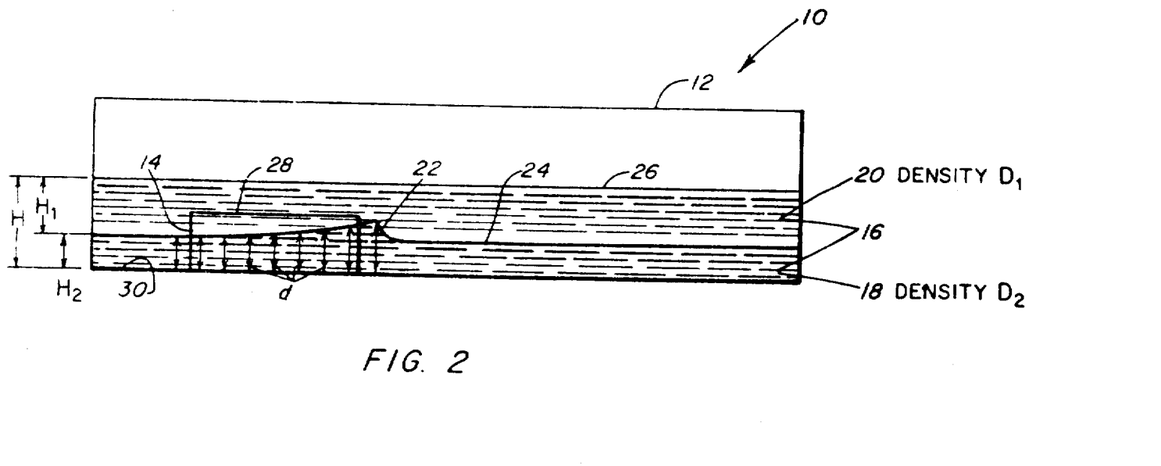
Figure 3:
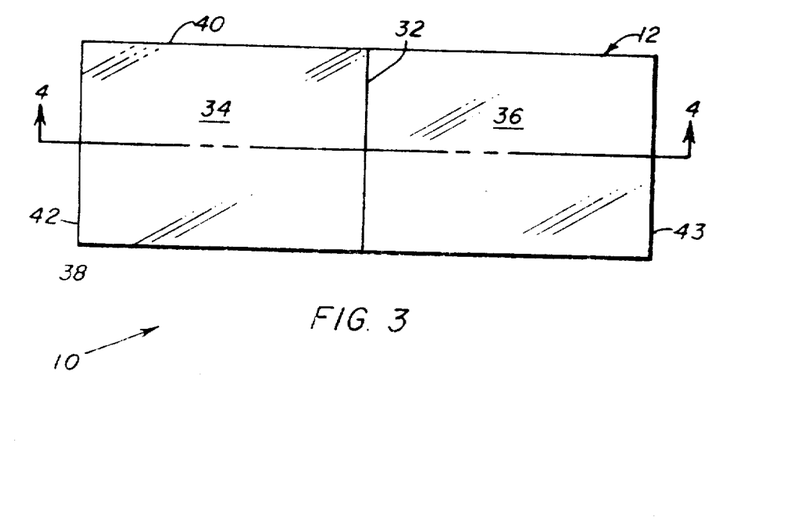

Shown in FIGS. 1 and 2 is a water table test instrument 10 for studying steady state supersonic gas flow characteristics. Instrument 10 includes a container 12 that is preferably long as compared to its width so that there is sufficient length of container for mdel 14 to traverse as hereinafter set out. Container 12 holds a shallow two layer body of liquid 16. The lower layer 18 and the upper layer 20 are two liquids, having different densities $D_2$ and $D_1$ respectively. Layers 18, 20 are immiscible with one another, therefore upper layer 20 floats on lower layer 18. Lower layer thickness $H_2$ must be thin as compared to upper layer thickness $H_1$ so that, as will be fully set out hereinafter, the wave 22 created at the interface 24 of the lower and upper layers does not extend to the upper surface 26 of the upper liquid layer and cause turbulence thereon. To be set out in the theory of operation section of this disclosure, the ratio of the upper layer thickness to the lower layer thickness, ($H_1/H_2$), and the ratio of the density of the upper liquid to the density of the lower liquid ($D_1/D_2$), are important parameters to be determined and depend on the specific heat ratio, $\gamma$, of the gas and the Mach number M, to be simulated.

A cross-sectional scale model 14 of the particular device being studied is placed in the liquid body near one end of the container so that it may traverse the length of the container. Model 14 is placed in container 12 so that the cross-sectional area, shown in FIG. 2 as 28, is parallel to container bottom 30.

The means to cause relative flow between model 14 and liquid 16 may be any of the means well known to those skilled in hydraulic analogy techniques and mechanical engineering. Such means include pulling the model with a magnet from beneath the container or tilting the container to cause the liquid body to flow past a stationary model. Other means can readily be devised and the instrument is therefore not to be considered limited to the means stated.

Figure 4:
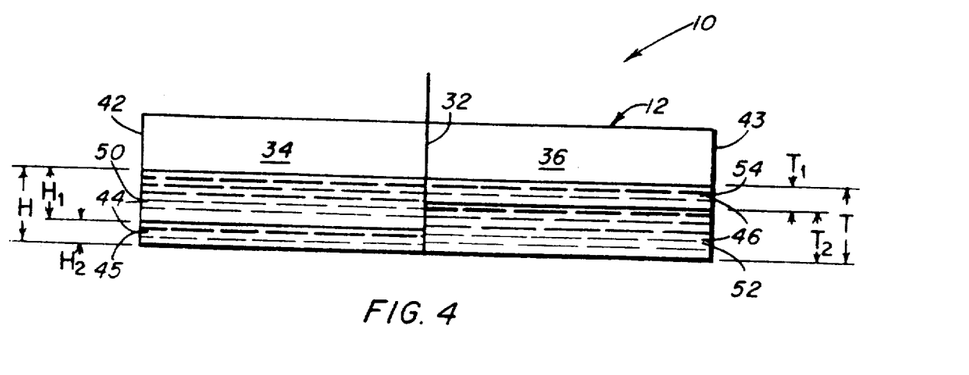
FIG. 4 is a vertical cross-sectional view through 4—4 of FIG. 3 showing details of the alternative embodiment.
Figure 5:
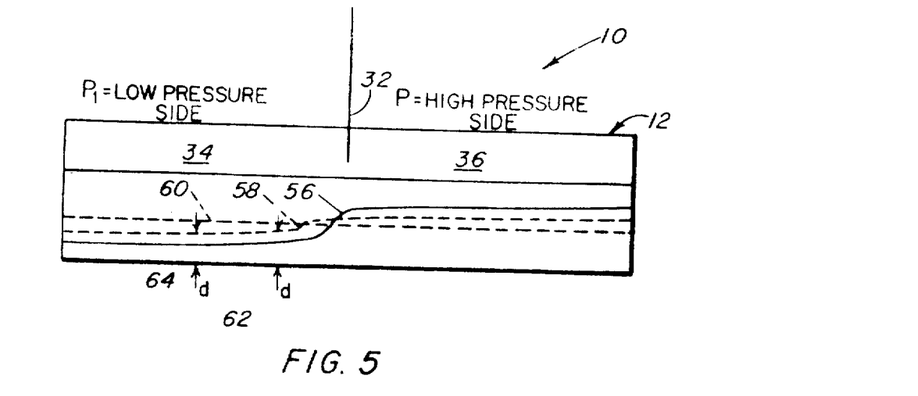
FIG. 5 is a vertical longitudinal cross-sectional view showing details of the invention in use for studying unsteady flow.

FIGS. 3, 4 and 5 show another embodiment of the invention for studying supersonic unsteady flow characteristics such as the flow of a gas under pressure $P_2$ from a tank through a device such as a valve to a lower pressure $P_1$. FIG. 4 shows the same water table 10 as in FIGS. 1 and 2 except gate 32 is slidably and vertically mounted within container 12 forming two containers 34, 36. Each container 34, 36 is bounded on three sides by container side walls 38, 40, one of the end walls 42, 43, and gate 32.

Containers 34, 36 hold shallow bodies of liquid 44, 46, see FIG. 4. Bodies 44, 46 are made up of the same immiscible liquids as the preferred embodiment shown in FIGS. 1 and 2. As in the steady flow device of FIGS. 1 and 2, the thickness $H_2$ of lower layer 45 of first container 34 is thin as compared to the thickness $H_1$ of first container 34 upper layer 50. The thicknesses $H_4$, $H_3$ see FIG. 4, of second container 36 lower layer 52 and upper layer 54 are determined according to the pressure ratio ($P_2/P_1$) to be simulated across gate 32. The determination of the respective liquid layer thicknesses $H_3$, $H_4$ will be fully set out in the theory of operation section hereinbelow.

When gate 32 is pulled quickly out of container 12 a wave 56 is created by the heavier lower layer 52 of second container 36 which progresses across the container. Three representative positions 56, 58, and 60 are shown in FIG. 5. The depth d of the lower layer in either container side is measured at locations of interest, such as at points 62, 64 in FIG. 5. Similarly the depth of the lower layer at points of interest, such as points 66, 68, 70, 72, and 74 in FIGS. 1 and 2 are measured. Measurements of the depth of the lower layer are analogous to flow conditions in the real gas system as hereinafter set out.

As shown in FIGS. 1 and 2, the preferred embodiment includes a camera mounted adjacent and perpendicular to longitudinal side member 38. The camera may be either of the type for taking still photographs, most suitable for the steady state device of FIGS. 1 and 2, or for taking motion pictures, most suitable for the unsteady flow device of FIGS. 3-5. The camera is adapted to photograph the liquid layers during operation, from which the layer depths can be determined by direct measurement therefrom. A still camera can be activated to take a single picture or sequence of photographs at any moment in time during the models motion, and a motion picture camera can be triggered to operate at any time during the models' travel. Because the flow in the device of FIGS. 3-5 is unsteady, it is preferable to take a motion picture or high speed sequential photographs beginning at the instant gate 32 is pulled from the container, so that depth measurements can be made for any instant of time during the flow. When the photographic technique for determining the layer depths is used, container side wall member 38 must be transparent to allow the liquid to be photographed. The photographic technique is only illustrative as a preferred means of determining the layer depths, and the invention is not to be considered limited thereto. Other means are readily determinable by those skilled in wave tank and water table use.

Having described the details of the preferred and alternative embodiments the following theory of operation and examples will describe the parameters to be considered and determined in carrying out their operation.

THEORY OF OPERATION

As stated, the basis for the single layer hydraulic analogy lies in the similarity between the equations of two dimensional isentropic gas flow and the equations of two dimensional open channel flow of incompressible fluids.

Analysis of these equations in the case of two layer open channel flow of the present invention rather than a single layer, shows that the specific heat ratio $\gamma$ in the hydraulic analogue depends on two ratios: first, the ratio of the density of the upper layer liquid, to the density of the lower layer liquid, and second, the ratio of the thickness of the upper layer to the thickness of the lower layer. The equation for the specific heat ratio evidencing this relationship is derived through algebraic manipulation of the above-mentioned gas and liquid flow equations, and is given as $$\gamma = \frac{2\left(1 - \frac{D_1}{D_2}\right)}{2\frac{D_1}{D_2}\frac{H_1}{H_2} + 1} \qquad \text{eq. 1}$$

where $\gamma$ is the specific heat ratio of the gas, and $D_1$, $H_1$, $D_2$, $H_2$ are the densities and thicknesses of the upper and lower liquid layers respectively. To simulate a specific heat ratio of a gas, the upper and lower liquids are chosen, thereby fixing the density ratio ($D_1/D_2$) which thereby establishes the liquid body thickness ratio ($H_1/H_2$). Knowing the thickness ratio, the thickness of the lower layer is chosen according to the considerations set out hereinafter.

The desirable density ratio is determined by the availability of fluids with appropriate densities, reasonable model speeds for taking data, and maintaining the lower layer thin as compared to the upper layer as determined hereinbelow. For the steady flow case of the embodiment shown in FIGS. 1 and 2 lower layer thickness $H_2$ determines the speed with which the model is to traverse the liquid medium so as to simulate a desired Mach number. In the hydraulic analogue the Mach number of the compressible system is analogous to the Froude number in the hydraulic system, where the Froude number, F, is given by the equation $$F = V/c \qquad \text{eq. 2}$$

where V is the model or fluid stream speed, and c is the wave propagation speed of natural disturbances on the upper surface of the thin lower layer, given by $$c = \sqrt{gH_2(1 - D_1/D_2)} \qquad \text{eq. 3}$$

Here, g is the gravitational constant and $H_2$ is the depth of the lower liquid body.

For the two layer system of the present invention the Froude number is analogous to the Mach number of the compressible flow under simulation.

The Froude number in equation 2 can therefore be replaced by the Mach number M, which is fixed by the predetermined supersonic speed at which the effects on the model are to be studied. The density ratio $(D_1/D_2)$ is fixed according to the considerations set out hereinabove. The thickness of lower layer $H_2$, which must be thin, is chosen so as to result in a model speed of practical magnitude as calculated from equation 2 with c replaced by equation 3, in the form $$V = M\sqrt{gH_2(1 - D_1/D_2)} \qquad \text{eq. 4}$$

Factors to be considered when choosing lower layer thickness $H_2$ are; the model speed m,ust not be so high as to cause excessive turbulence within the liquid body, the lower layer must not be so thick that bow wave 22 will flow over the top of the model, and the speed of the model must be of a magnitude that allows sufficient time for depth measurements or photographs, as hereinabove set out, to be made. Additionally, the thickness of the lower layer must be thin as compared to the wavelength of random natural disturbances that are induced on the top surface of the lower liquid body. This ensures the wave propagation speed will satisfy equation 3. Typically these random disturbances are of comparatively long wavelength, i.e., 1-2 cm. Therefore it is desirable to keep the lower layer thickness on the order of a few millimeters. Those skilled in hydraulic analogy techniques will readily be able to choose appropriate relative speeds so as to keep the lower layer within the confines of the above restrictions.

Having determined the lower layer thickness to simulate the desired Mach number, the upper layer depth is calculated either from equation 1 rearranged as $$H_1 = H_2 \frac{(2/\gamma)(1 - D_1/D_2) - 1}{\sqrt{2D_1/D_2}} \qquad \text{eq. 5}$$

or from the depth ratio which is also determined from equation 1. Model 14 is then placed on container bottom 30 and the relative flow caused to occur at the speed calculated from equation 4.

Measurements of the lower layer depth d are taken from photographs made during the period of relative flow at locations where data is desired. For example, FIGS. 1 and 2 show points 66-74 at which the depth of lower layer may be measured as model 14 traverses the liquid body. The depth measurements, d are converted to analogous characteristics in the compressible medium according to the following relationships.

$$P = (d/H_2)^2 P_2 \qquad \text{eq. 6}$$

where P is the pressure in the gas system at the test point, d is the measured depth of the lower layer liquid in the test instrument during the period of relative flow, $H_2$ is the depth of the lower liquid upstream ahead of the bow wave and $P_2$ is the pressure of the gas upstream of the bow shock.

$$\rho = (d/H_2)\rho_2 \qquad \text{eq. 7}$$

where $\rho$ is the density of the gas in the full scale system at the test point, and $\rho_2$ is the density of the full scale system upstream of the bow shock.

$$T = (d/H_2)T_2 \qquad \text{eq. 8}$$

where T is the temperature of the gas in the full scale gas system at the test point, and $T_2$ is the temperature of the full scale system upstream of the bow shock.

EXAMPLE 1

Having described the details of the preferred embodiment of the steady state flow device and the theory of its operation, the following example will make more clear the above theory and operation.

Shown in FIGS. 1 and 2 is the case in which it is desired to study the supersonic flow of air across an airfoil, at Mach 1.5. It is well known that the specific heat ratio, $\gamma$ for air is 1.4. As disclosed, density ratio $(D_1/D_2)$, thickness ratio $(H_1/H_2)$, and the relative speed v between the model and liquid body are all interrelated and values of each are determined taking into account the above considerations.

Here, mercury having a density of 13.6 was chosen as the lower liquid and either methyl or ethyl alcohol, having a density of 0.79, was chosen as the upper liquid. Therefore, $(D_1/D_2) = 0.0581$. From equation 1 thickness ratio $(H_1/H_2)$ is fixed as 2.95 for $\gamma = 1.4$ and $(D_1/D_2) = 0.0581$. The speed of the model (relative flow between the model and liquid body) to simulate Mach 1.5 is calculated from equation 4, after choosing a lower layer thickness $H_2 = 0.3$ cm in keeping with the thin layer prerequisite stated above. Upper layer thickness $H_1$ is then calculated as 8.8 mm either from equation 5, or from the thickness ratio. The calculated model speed from equation 4 is 24.9 cm/sec which is a reasonable speed for avoiding excessive turbulence in the liquid and for taking photographs or motion pictures of the model from which the depth measurements at the desired locations are taken.

It can be appreciated that the number of liquids that are suitable for use as the lower liquid is restricted to those having densities much greater than water and the availability of such liquids is limited. Mercury has been determined to be the most suitable and is the preferred lower layer liquid.

The number of liquids that are suitable for use as the upper liquid is less restrictive because of the greater number of liquids having densities less than water. For example, turpentine would be a suitable upper liquid in addition to methyl or ethyl alcohol.

For the example given herein mercury is placed into the container to a depth of 3 millimeters, and an 8.8 millimeter thick layer of methyl or ethyl alcohol is placed on top of the mercury. The model is placed in the liquid body resting on the container bottom with its cross-sectional area parallel to the container bottom. Means for causing the relative flow is adjusted to cause the model or liquid body to move at a speed of 24.9 cm/sec. The depth of the mercury at locations to be studied is measured during the period of relative flow from photographs or motion pictures taken thereof. The depth measurements are converted to analogous pressure, density and temperature conditions for the full scale air system according to equations 6, 7, and 8.

Referring to FIGS. 4 and 5 showing the embodiment used to study unsteady flow, the following explanation of the theory of operation will make the description and operation of the embodiment more clear.

As with the steady flow situation, the density ratio and thickness ratio of the two liquid layers determines the specific heat ratio to be simulated according to equation 1. Likewise the lower layer thickness $H_2$ of the body of liquids in first container 34 must be thin according to the above considerations. After choosing lower layer thickness in first container 34, the thickness $H_4$ of the lower layer in second container 36 is set so as to simulate the pressure ratio ($P_2/P_1$) across the system under study. The pressure ratio across the system ($P_2/P_1$) is represented by pressure $P_2$ simulated by the fluid body in second container side 36 to the pressure $P_1$ simulated by the fluid body in first container side 34 and is given by the relationship $$\frac{P_2}{P_1} = \frac{H_4}{H_2} \qquad \text{eq. 9}$$

where $H_4/H_2$ is the ratio of the lower layer thicknesses in the second to first containers 36, 34 respectively.

From the above considerations the thickness $H_2$ of the first container lower layer is chosen first. Knowing the densities of the two fluids and the specific heat ratio to be simulated, the upper layer thickness $H_1$ is calculated either from equation 5 or the thickness ratio which is determined from equation 1.

The total thickness H of the liquid body in second high pressure $P_2$ container 36 is the same as the total thickness H of the liquid body in the first container 34. Lower layer thickness $H_4$ of the second container depends on the pressure ratio to be simulated and is calculated from equation 9 rearranged as $$H_4 = H_2 P_2/P_1 \qquad \text{eq. 10}$$

Upper layer thickness $H_3$ is the difference between the total thickness H, and lower thickness $H_4$.

The fluids, and restrictions thereon, for use in the embodiment shown in FIGS. 4 and 5 are the same as those for the embodiments of FIGS. 1 and 2 with the preferred fluids again being mercury for the lower liquid and either methyl or ethyl alcohol as the upper liquid. In operation each container is filled with the appropriate level of fluid and the gate is quickly pulled upward. Bow wave 56 is created which progresses across the container. The depth d of the lower layer is measured from photographs or motion pictures of the flow at any point within the container, such as at points 62, and 64 in FIG. 5, and converted to analogous compressible conditions by equations 6, 7, and 8 given hereinabove. FIGS. 4 and 5 are representative of a system for testing the unsteady flow of a gas through a device such as a valve. First container 34 represents the conditions down stream of the valve, and second container 36 represents the high side pressure on the valve. Other systems can be easily simulated by the technique and are to be considered within the scope of the invention.

By way of further illustration of the procedure for determining the values of the parameters to be determined in studying unsteady flow according to the invention, the following example is given.

EXAMPLE 2

If it were desired to study the pressure, density and temperature effects across a valve through which air, having a specific heat ratio of 1.4, is flowing from a pressure of 1.5 atmospheres to 1 atmosphere, the following steps would be taken in determining the depths of the two layers in each container of the instrument.

First mercury and methyl alcohol are chosen as the two fluids to be used, thereby fixing the density ratio ($D_1/D_2$) at 0.0581.

From equation 1 thickness ratio ($H_1/H_2$) is 2.95. First container lower layer thickness $H_2$ is chosen as 2 mm in keeping with the thin layer considerations, thereby fixing first container upper layer thickness $H_1$ as 5.90 mm from equation 5. Total liquid body thickness H is 7.9 mm.

Thickness ratio ($H_4/H_2$) from equation 9 to simulate a pressure ratio ($P_2/P_1$) of 1.5 is found to be 1.5. Knowing thickness ratio ($H_4/H_2$) and first container lower layer thickness $H_2$, 2nd container lower thickness $H_4$ is calculated as 3 mm. Second container top layer thickness $H_3$ is therefore 4.9 mm.

With gate 32 in place, mercury is placed in first container 34 to a depth of 2 mm and also in second container 36 to a depth of 3 mm. Methyl or ethyl alcohol is then placed on top of the mercury in each container to bring the total liquid body thickness in each container to 7.9 mm. When gate 32 is pulled out, the transient flow of air from 1.5 atmospheres to 1 atmosphere is simulated, and depth measurements are taken by the photographic technique as heretofore stated.

Having described the invention in detail other embodiments and modifications will come to the mind of those skilled in the art having the benefit of the teachings herein, therefore such modifications and embodiments are to be considered within the scope of the appended claims.

What is claimed is:

1. A method of studying steady state supersonic gas flow characteristics at desired locations by simulating the specific heat ratio of the gas and the Mach number of the supersonic flow, the steps comprising:
   providing for a container having a flat bottom;
   establishing in the container a body of liquid having a lower layer of a liquid of depth $H_2$ and density $D_2$ resting on the container bottom and further having an upper layer of a liquid of depth $H_1$ and density $D_1$ less than said lower layer density floating on said lower layer for simulating the specific heat ratio of the gas, said layers form an interface therebetween;
   providing for a cross-sectional model submerged in said liquid body, said model rests on the container bottom and extends through said interface terminating within the upper layer;

causing relative flow between the model and the body of liquid for simulating the Mach number of said gas flow;

measuring the depth of the lower layer at said locations to be studied while said relative flow takes place, said measurements being analogous to supersonic gas flow characteristics.

2. The method as defined in claim 1 wherein the lower layer liquid is mercury.

3. The method as defined in claim 1 wherein the upper layer liquid is methyl alcohol.

4. The method as defined in claim 1 wherein the upper layer liquid is ethyl alcohol.

5. The method as defined in claim 1 wherein the upper layer liquid is turpentine.

6. The method as defined in claim 1 wherein the upper layer thickness is determined according to the equation $$H_1 = H_2 \frac{(2/\gamma)(1 - D_1/D_2) - 1}{\sqrt{2D_1/D_2}}$$

where $H_1$ is the upper layer thickness, $H_2$ is the lower layer thickness, $D_1$ and $D_2$ are the densities of the upper and lower liquids, and $\gamma$ is the specific heat ratio of the gas to be simulated.

7. The method as defined in claim 1 wherein the relative flow is determined according to the equation, $$V = M\sqrt{gH_2(1 - D_1/D_2)}$$

where V is the speed of relative flow, M is the Mach number to be simulated, g is the gravitational constant and $D_1$ and $D_2$ are the densities of the upper and lower liquids, and $H_2$ is the thickness of lower layer.

8. A method of studying unsteady supersonic gas flow characteristics at desired locations by simulating the specific heat ratio of the gas and the pressure ratio across the gas flow system being studied the steps comprising:

providing for a container having a flat bottom and further having means for dividing said container into a low pressure container side and a high pressure container side, said flat bottom forms the bottom of each of said container sides;

establishing a body of liquid in said low pressure container side having a lower layer of a liquid of depth $H_2$ and density $D_2$ resting on said container bottom, and further having an upper layer of a liquid of depth $H_1$ and density $D_1$ less than said lower layer density floating on said lower layer for simulating the specific heat ratio of the gas said layers form an interface therebetween;

establishing a body of liquid in said high pressure container side having a lower layer of the same liquid as said lower layer in the low pressure container side having a thickness $H_4$ resting on the container bottom and further having an upper layer of the same liquid as the upper layer in the low pressure container side of thickness $H_3$ floating on said high pressure container lower layer, the high pressure container lower layer thickness and the low pressure lower layer thicknesses adjusted to simulate said pressure ratio;

causing flow to occur from the high pressure container side to the low pressure container side, said flow simulates the unsteady supersonic gas flow to be studied;

measuring the depth of the lower layers at the desired locations to be studied while the flow takes place, said lower layer depth measurements being analogous to supersonic gas flow characteristics.

9. The method as defined in claim 8 wherein the lower layer liquid in the low and high pressure side containers is mercury.

10. The method as defined in claim 8 wherein the upper layer liquid in the low and high pressure side containers is methyl alcohol.

11. The method as defined in claim 8 wherein the upper layer liquid in the low and high pressure side containers is ethyl alcohol.

12. The method as defined in claim 8 wherein the upper layer liquid in the low and high pressure side containers is turpentine.

13. The method as defined in claim 8 wherein the thickness of the upper layer in the low pressure side container is determined according to the equation:

$$H_1 = H_2 \frac{(2/\gamma)(1 - D_1/D_2) - 1}{\sqrt{2D_1/D_2}}$$

where $H_1$ is the thickness of the upper layer on the low pressure side container, $H_2$ is the thickness of the lower layer in the low pressure side container, $D_1$ and $D_2$ are the densities of the upper and lower layer liquids, and $\gamma$ is the specific heat ratio of the gas to be simulated.

14. The method as defined in claim 8 wherein the thickness of the lower layer in the high pressure side container is determined according to the equation:

$$H_4 = H_2 P_2/P_1$$

where $H_4$ is the thickness of the lower layer in the high pressure container side, $H_2$ is the thickness of the lower layer in the low pressure container side, and $(P_2/P_1)$ is the pressure ratio to be simulated.

* * * * *

UNITED STATES PATENT AND TRADEMARK OFFICE
CERTIFICATE OF CORRECTION

PATENT NO. : 4,430,890

DATED : February 14, 1984

INVENTOR(S) : Franklin D. Hains

It is certified that error appears in the above-identified patent and that said Letters Patent is hereby corrected as shown below:

The title page should be deleted to appear as per attached title page.

Figures 1-3 of the drawings should be deleted to be replaced with figures 1-5 as shown on the attached sheet.

Signed and Sealed this

Tenth Day of June 1986

[SEAL]

Attest:

*Attesting Officer*

DONALD J. QUIGG

*Commissioner of Patents and Trademarks*

United States Patent [19]

Hains

[11] 4,430,890

[45] Feb. 14, 1984

[54] TWO LAYER HYDRAULIC ANALOGY METHOD FOR TESTING SUPERSONIC GAS FLOWS WITH SHOCK WAVES

[75] Inventor: Franklin D. Hains, Falls Church, Va.

[73] Assignee: The United States of America as represented by the Secretary of the Navy, Washington, D.C.

[21] Appl. No.: 378,161

[22] Filed: May 14, 1982

[51] Int. Cl.$^3$ ............................................. G01M 9/00
[52] U.S. Cl. .................................. 73/147; 73/432 SD
[58] Field of Search ............................. 73/147, 432 SD

[56] References Cited

PUBLICATIONS

Hoyt, Applied Mechanics Review, vol. 15, No. 6, pp. 419–423, Jun. 1962.
Shapiro, Physical Measurement in Gas Dynamics and Combustion, Princeton University Press, pp. 309–321, 1954.

Primary Examiner—Donald O. Woodiel
Attorney, Agent, or Firm—R. F. Beers; K. E. Walden; D. J. Breh

[57] ABSTRACT

A method of studying steady and unsteady supersonic gas flow using a two layer hydraulic analogy technique. The method simulates the specific heat ratio of the gas. Two layers of immiscible liquids having different densities and thicknesses are held in a shallow container. The densities are chosen and the layer thicknesses are adjusted to simulate the specific heat ratio of the gas. A model of a device to be studied is submerged in the liquid. Relative flow is caused to occur between the model and liquid simulating steady flow. The depth of the lower layer during the period of relative flow is measured and is analogous to steady state gas flow characteristics. For studying unsteady flow two bodies of liquids each having two layers of liquids of densities chosen, and lower layer thicknesses adjusted to simulate the specific heat ratio of the gas and to simulate a high and low pressure across a gas system, are held in a container separated by a removable gate. Flow is caused to occur from the high to low pressure liquid body simulating unsteady flow. The depth of the lower layers during the period of flow is analogous to unsteady gas flow characteristics.

14 Claims, 5 Drawing Figures